United States Patent [19]

McAllister

[11] Patent Number: 5,655,007

[45] Date of Patent: *Aug. 5, 1997

[54] TELEPHONE BASED CREDIT CARD PROTECTION

[75] Inventor: Alex McAllister, Wheaton, Md.

[73] Assignee: Bell Atlantic Network Services, Inc., Arlington, Va.

[ * ] Notice: The term of this patent shall not extend beyond the expiration date of Pat. No. 5,513,250.

[21] Appl. No.: 363,041

[22] Filed: Dec. 23, 1994

Related U.S. Application Data

[63] Continuation-in-part of Ser. No. 322,133, Oct. 13, 1994, Pat. No. 5,513,250.

[51] Int. Cl.⁶ .................................................. H04M 11/00
[52] U.S. Cl. .............................. 379/91.01; 379/88
[58] Field of Search ................... 379/91, 88, 89, 379/93, 94, 201, 95

[56] References Cited

U.S. PATENT DOCUMENTS

| | | |
|---|---|---|
| 4,485,300 | 11/1984 | Peirce . |
| 4,796,292 | 1/1989 | Thomas . |
| 5,315,641 | 5/1994 | Montgomery et al. . |
| 5,513,250 | 4/1996 | McAliister ................................. 379/91 |

*Primary Examiner*—Stella Woo
*Attorney, Agent, or Firm*—Lowe, Price, LeBlanc & Becker

[57] ABSTRACT

A system and method for enhancing the security of use of a transaction device such as a transaction card through a telephone system wherein subscribers to the service may require voice authentication as a prerequisite to a conventional transaction card authentication step. The service is automatically invoked based on a code inserted in the card, or the identity of the calling subscriber, or the identity of the called authentication bureau. The service may also be invoked in situations which do not involve the use of a transaction device but which require the input of an identifying password or number when seeking access to limited access data or services.

29 Claims, 6 Drawing Sheets

TELEPHONE BASED CREDIT CARD PROTECTION

RELATED APPLICATIONS

This application is a continuation-in-part of application Ser. No. 08/322,133, filed Oct. 13, 1994, now U.S. Pat. No. 5,513,250 for Telephone Based Credit Card Protection, having a common assignee with the present application.

TECHNICAL FIELD

The present invention relates to providing enhanced credit card protection utilizing a switched telephone network having a signaling communication system separate from the trunk circuits for two-way data communication and an intelligent peripheral platform.

BACKGROUND ART

There presently exists a number of transaction card networks which issue a particular type of transaction card to their customers. Each of these types of card bear a common trademark of the network, such as Visa or Mastercard. Nonetheless, it is the individual financial institutions (issuers) which maintain the accounts of the customers. Accordingly, in order to authorize a transaction, it is often necessary to contact the issuer so that information about a particular account can be accessed.

When a transaction card is presented for a purchase, some form of authorization is typically sought to minimize the risk of loss to the merchant. Historically, the earliest method of authorization consisted of consulting a list of bad account numbers. This list is distributed by the network operator based on information obtained from the card issuers. The account numbers in the list represent cards which should not be accepted. These cards may have been reported lost or stolen or simply represent accounts where the credit limit has been exceeded. If the account number of the card is not present on the list, the merchant can accept the card for the purchase.

More recently, there have been developed relatively sophisticated electronic authorization networks. In these communication networks, the merchant is provided with an intelligent terminal which can read account information encoded on the magnetic stripe of the transaction card. The terminal will then automatically call a central processor, operated by the network which will analyze the authorization request. The call from the terminal is typically routed through a local financial institution, associated with the merchant.

Once the central processor receives the call, it will then initiate an electronic data link to the processor operated by the card issuer to determine if the transaction should be approved. The processor at the issuer will check the status of the account within its data base and generate a response. This electronic response is then routed back to the merchant's terminal. In some cases, where the issuer's computer is not available, the central processor itself can act on the authorization request and perform what is known as stand-in processing. This process occurs electronically without human intervention. A more complete description of this type of electronic authorization system is described in U.S. Pat. No. 4,485,300.

Most requests for transaction authorizations can be completed electronically within the network system outlined above. However, in a small percentage of the cases, the limited information which is transmitted to the issuer's computer is deemed insufficient to complete the authorization process. In these cases, rather than approving or declining the transaction, the issuer's computer will generate a "referral" message. A referral message signals the merchant that more information is necessary to complete the authorization procedure.

Presently, the steps which must be taken by the merchant in response to a referral message are time consuming and cumbersome. More specifically, the merchant must first make a standard telephone call to an operator at his local financial institution to initiate the inquiry. The operator there will then determine the identity of the issuer of the card and call an operator at that issuer. The operator at the issuer will inform the operator at the acquirer what additional authorization information is necessary to confirm the identity of the customer. This information could include, for example, a request for a driver's license number of the customer. The operator at the acquirer will then call back the merchant and request the desired information. When the information is received, the operator will then supply the information to the operator at the issuer. The issuer will then decide if the transaction can be approved and provide a response to the operator at the acquirer. The operator at the acquirer will then relay the response to the merchant.

The above described process often requires four separate telephone calls and generally takes from 8–12 minutes. As can be appreciated, this delay at the point of sale is unacceptable for both the merchant and the customer. It is hardly surprising that in about half of all cases where a "referral" message is generated in domestic transactions, merchants will not go through with the referral procedure. It is far simpler for the merchant to ask the customer to provide another form of payment, such as a check or another credit card. As can be appreciated, each time a merchant switches to another form of payment, the sale through the network generating the response is lost.

While referral responses are generated in only about one percent of all authorization requests, in absolute terms the number is quite high. At the present time, there are over 600,000 referral requests generated per month in one nationally prominent network. It has been found that of the fifty percent of domestic transactions where the merchant does not carry out the referral procedure, upwards of ninety percent of the transactions would have been approved by the issuer. Also significant is the fact that the referral responses typically are generated on transaction having a high dollar amount. Based on the above statistics, it has been estimated that the present system which discourages handling referrals, creates a loss of about one billion dollars per year in transactions for the network. Therefore, it will be apparent that an improvement in security of credit and debit card transactions would meet an outstanding need of significant magnitude.

Above identified parent application Ser. No. 08/322,133 (680-108) described an improved system and method for assuring added security in the use of credit or debit cards using a unique methodology adapted to be implemented by largely existing facilities in a public switched telephone network having an advanced intelligent signaling network and one or more intelligent peripheral platforms. According to one version of the system there described, the credit card holder subscribes to a security service in return for an incentive such as may be provided by the credit card issuing entity, such as offering a reduction of interest rate or a percentage rebate on purchases for use of the new system. The credit card holder was permitted to subscribe to the new service through his residence telephone to set up a Personal Identification Number (PIN) and/or a voice print or template to control his credit card use. Having subscribed to the service and established such a PIN and voice template the card holder could utilize the credit card security procedure. Prior to use of the card the card holder accessed the security system by telephone, preferably but not necessarily his residence telephone, and effected verification by the preestablished PIN or voice template or both. Following such verification the card holder established or set at least one- and preferably two or more of the following parameters:

1. A stated time frame during which the card will be activated, for example, for the next three hours.

2. A dollar limit on the purchasing power of the card during that time.

3. A geographical area or location wherein the card will be activated. This may be a central office or NXX area, a county, city, state or zip code area, or the like.

4. A temporary PIN which the subscriber desires to have applicable under the restrictions set under 1, 2 and 3 above.

5. A voice verification using the preestablished template.

Following the establishment or setting of these parameters the point-of-sale authorization or usability of the credit card is then subject to those restrictions and will be activated only if all such restrictions are satisfied. The system and method can be accomplished using elements which are for the most part found in modern public switched telephone networks or at least in those which possess an Advanced Intelligent Network (AIN). This includes such features as common channel signaling, such as SS7 or the like, and one or more intelligent peripheral platforms. The location of attempted use of the credit card, usually a point-of-sale, was identified by the incoming call from the merchant presenting signals in the telephone network, such as ICLID, DNIC, or ANI. That system also provides for further verification by permitting a sales clerk at the point-of-sale terminal to mandatorily or optionally request the temporary PIN and confirmation of identify by voice authentication using the prestored voice template. A telephone station is normally available at the point-of-sale verification device.

BRIEF DESCRIPTION OF THE INVENTION

According to the present invention the use of the added security system and method may be preestablished by virtue of coding inserted in the data carried by the credit card, such as in the commonly used magnetic strip. When the card is passed through the card reader at the point of use, such as at the point of sale or at an Automatic Teller Machine (ATM) or the like, the verification procedure that would ordinarily follow is suspended pending satisfaction of the requirements of the added security measures.

According to another embodiment of the invention the requirement for the performance of the security measure is triggered by the origin of the request for verification. Thus a banking establishment or a chain of restaurants, department stores, gas stations, or the-like may subscribe to the service so that any request for verification originating at a card reader at a point of transaction maintained by such establishment will trigger suspension of the usual verification pending successful completion of the added security procedure. In this embodiment of the invention there is no necessity for insertion of special coding in the credit card. This may be desirable to certain establishments who accept a variety of cards, such as restaurants, department stores or gas stations or the like. Banking establishments using ATM machines will customarily accept only a card issued by that establishment and thus the use of the added code presents no problem.

In the embodiment of the invention wherein the credit card does not include an added code, the suspension of the customary verification is preferably triggered by a signal generated by the telephone network, such as an origin indication which may be provided by the ANI or ICLID signals. Alternatively the requirement for the added security may be provided on a more regional basis such as dependent upon the NNX of the calling number. In a yet further embodiment the service may be subscribed to or required by the transaction card validation or verification bureau or establishment, so that suspension is triggered by the identity of the called directory number. The signaling is preferably carried out by common channel signaling as presently described in further detail.

The added security methodology preferably requires voice verification and may also require one of more of the added limitations on card usage above described and detailed further hereinafter.

DETAILED DESCRIPTION

Figure 1:
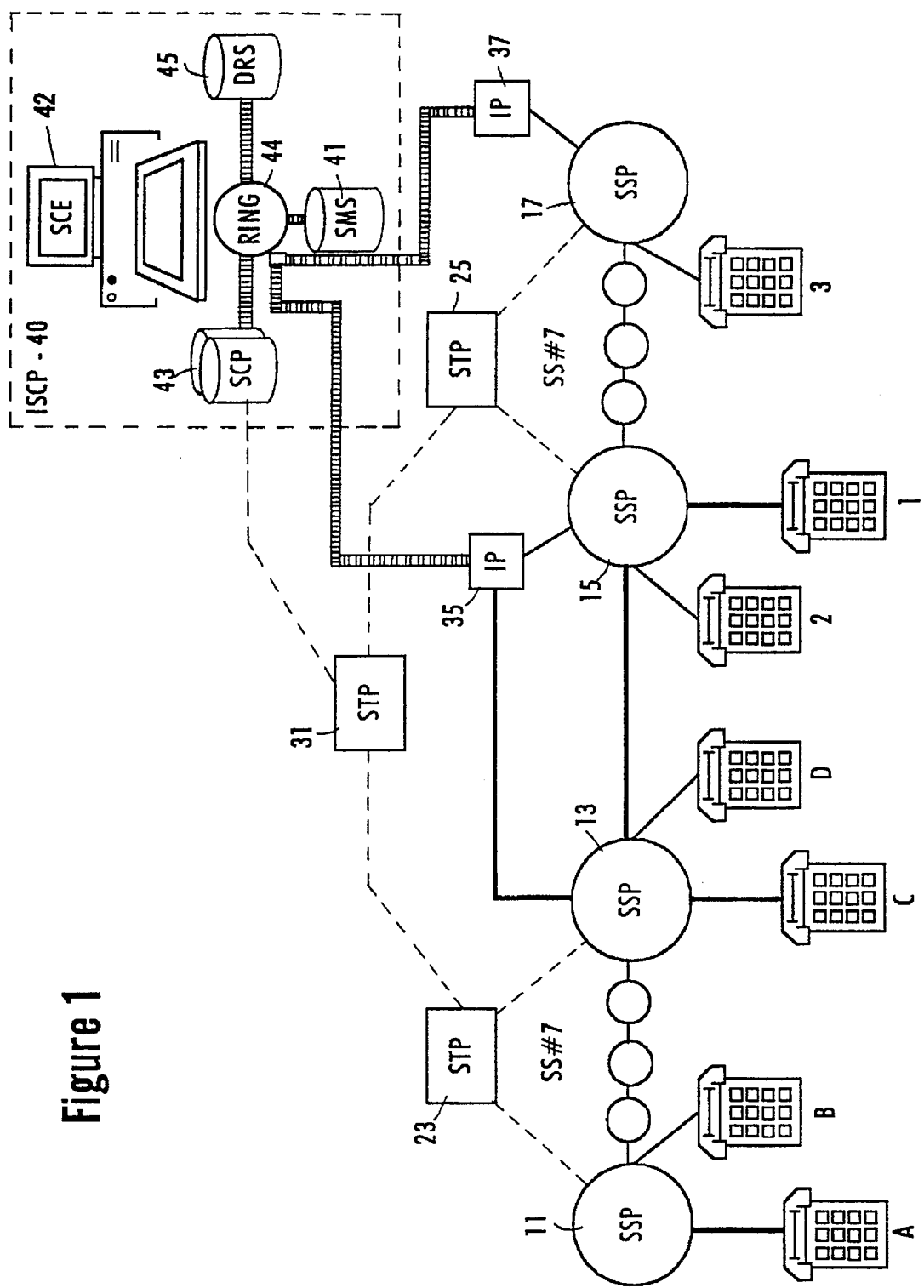
FIG. 1 is a diagrammatic illustration of a preferred embodiment of a switched telephone network featuring details of the advanced intelligent network (AIN) and showing intelligent peripheral platforms such as used according to the present invention.

Referring to FIG. 1 there is shown a first embodiment of a switched telephone network featuring details of the Advanced Intelligence Network (AIN) and the intelligent peripheral platforms utilized in the present invention.

In the network shown in FIG. 1, each central office switching system (CO) 11, 13, 15, 17 is labeled as an "SSP." The Service Switching Points, referred to as SSP's, are appropriately equipped programmable switches present in the telephone network, which recognize AIN type calls, launch queries to the ISCP and receive commands and data from the ISCP to further process the AIN calls. In the illustrated embodiment, the CO-SSP's are end offices.

As shown in FIG. 1, all of the end office switches 11, 13, 15 and 17 are equipped and programmed to serve as SSP's. The illustrated embodiment is perhaps an ideal implementation which would make a variety of Advance Intelligent Network (AIN) services widely available at the local office level throughout the network. Other AIN implementations provide the SSP functionality only at selected points in the network, and end offices without such functionality forward calls to an SSP switching office having tandem switching capabilities.

SSP capable central office switching systems typically consist of a programmable digital switch with CCIS communications capabilities. One example of an SSP capable CO switch is a 5ESS type switch manufactured by AT&T; but other vendors, such as Northern Telecom and Siemens, manufacture comparable digital switches which could serve as the SSP's. The structure of an exemplary CO which may serve as the SSP type CO's in the system of FIG. 1 will be discussed in more detail below, with regard to FIG. 2.

With reference to FIG. 1, the SSP type CO's 11 and 13 connect to a first local area STP 23, and the SSP-CO's 15 and 17 connect to a second local area STP 25. The connections to the STP's are for signaling purposes. As indicated by the circles below STP's 23 and 25, each local area STP can connect to a large number of the SSP-CO's. The central office SSP's are interconnected to each other by trunk circuits (illustrated in FIG. 1 as bold lines) for carrying telephone services.

The local area STP's 23 and 25, and any number of other such local area STP's (not shown) communicate-with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. Also, certain switching offices within the network, whether SSP's or not, may function primarily as tandem type offices providing connections between trunk circuits only.

The links between the central office switching systems (CO's) and the local area STP's 23 and 25 are typically SS7 type CCIS inter-office data communication channels. The local area STP's are in turn connected to each other and to the regional STP 31 via a packet switched network. The regional STP 31 also communicates with the ISCP 40 via a packet switched network.

The above described data signaling network between the SSP type central offices and the ISCP is preferred, but other signaling networks could be used. For example, instead of the CCIS links, STP's and packet networks, a number of central office switches and an ISCP could be linked for data communication by a token ring network. Also, the SSP capability may not always be available at the local office level, and several other implementations might be used to provide the requisite SSP capability, as will be discussed in more detail later.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID, second alternate carrier ID, a routing number, and a destination number. The TCAP specifies a number of additional message formats. For example, a format for a subsequent query from the SSP, and formats for "INVOKE" messages for instructing the SSP to play an announcement or to play an announcement and collect digits and a "SEND TO RESOURCES" message instructs the SSP to route to another network node.

There may be one or more ISCP's per state, to avoid overloading existing CCIS data links. Alternatively, the ISCP could be implemented on a LATA by LATA basis or on a regional operating company basis, i.e., one database for the entire geographic area serviced by one of the Regional Bell Operating Companies. In fact, if federal regulations permitted, the database service could become nationwide.

As shown, the ISCP 40 includes a Service Management System (SMS) 41, a Data and Reporting System (DRS) and the actual database referred to as the Service Control Point (SCP) 43. The ISCP also typically includes a terminal subsystem referred to as a Service Creation Environment or SCE 42 for programming the database in the SCP 43 for the services subscribed to by each individual customer. These components of the ISCP 40 communicate with each other via a token ring network 44. The SCP database 43 stores data tables used to control telephone services provided through the network to callers using telephone stations.

Figure 2:
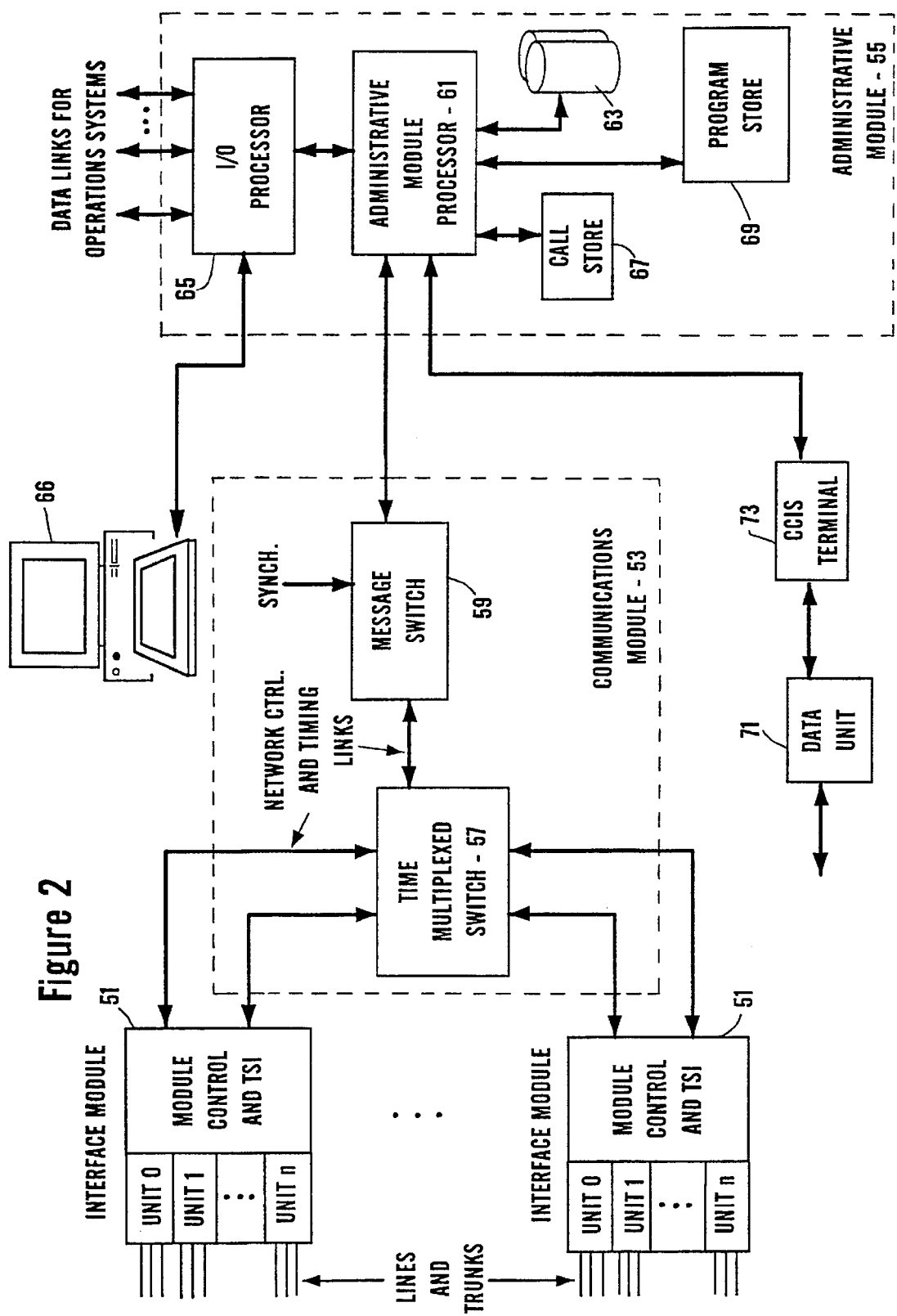
FIG. 2 is a diagram of an SSP type central office used in the preferred intelligent network implementation of the present invention.

FIG. 2 is a simplified block diagram of an electronic program controlled switch which may be used as any one of the SSP type CO's in the system of FIG. 1. As illustrated, the CO switch includes a number of different types of modules. In particular, the illustrated switch includes interface modules 51 (only two of which are shown), a communications module 53, and an administrative module 55.

The interface modules 51 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones. The SCP database 43 stores data tables used to control telephone services provided through the network to callers using telephone stations.

In the normal plain old telephone service (POTS) type call processing, the central office switching system responds to an off-hook at one of the telephone stations and receives dialed digits from the calling station. The central office switching system analyzes the received digits to determine if the call is local or not. If the called telephone station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signaling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the local central office (CO) suspends the call and sends a query message through one or more of the STP's. The query message goes to the central office to which the called station is connected, referred to as the "terminating" central office. For example, for a call from station A to station C the query would go from originating SSP-CO 11 to terminating SSP-CO 13. The terminating central office determines whether or not the called station is busy. If the called station is busy, the terminating central office so informs the originating central office which in turn provides a busy signal to the calling station. If the called station is not busy, the terminating central office so informs the originating Central office. A telephone connection is then constructed via the trunks and central offices (and/or tandem offices) of the network between the calling and called stations. The receiving central office then provides a ringing signal to the called station and sends ringback tone back through the connection to the calling station.

In an Advanced Intelligent Network (AIN) type system, such as shown in FIG. 1, certain telephone calls receive specialized AIN type processing under control of data files stored in the SCP database 43 within the ISCP 40. In such a network, the SSP type local offices of the public telephone network include appropriate data in the translation tables for customers subscribing to AIN services to define certain call processing events identified as AIN "triggers". Using the translation table data from disk memory 63, the SSP will detect such triggering events during processing of calls to or from such AIN service subscribers.

The SSP type switches can recognize a variety of events as triggers for activating a query and response type AIN interaction with the ISCP. A number of different AIN triggers are used, depending on the precise type of service the AIN will provide a particular subscriber. For example, if a subscriber has a speech responsive auto-dialing service, an off-hook immediate trigger might be stored in the translation table file for that subscriber in the SSP. The SSP would detect the trigger each time the subscriber goes off-hook on that line and then attempt to obtain further instructions from the ISCP.

For ordinary voice grade telephone service calls, there would be no event to trigger AIN processing; and the local and toll office switches would function normally and process such calls as discussed above, without referring to the SCP database for instructions. In a first mode of operation, an SSP type office (CO or tandem) which detects a trigger will suspend call processing, compile a TCAP formatted call data message and forward that message via a common channel interoffice signaling (CCIS) link and STP(s) to the ISCP 40 which includes the SCP database 43. The ISCP accesses its stored data tables to translate the received message data into a call control message and returns the call control message to the office of the network via CCIS link and STP(s). The SSP then uses the call control message to complete the particular call through the network. For AIN calls requiring a processing feature provided by the peripheral platform, the call control message would instruct the SSP to route the call to the associated peripheral platform.

The IP 37 performs DTMF digit collection and voice announcement functions on telephone calls for a wide variety of telephone services available through the network. According to the invention and as discussed in more detail later, the IP provides voice recognition capabilities for such interactions. Advanced implementations of the IP will also include various data communications means, e.g., for FAX mail services, screen-phone services, etc.

The illustrated preferred embodiment includes two signaling communications systems carrying data to and from the ISCP 40. The communications links of the first such signaling network appear in the drawing as dashed lines, and the communications links of the second-such signaling network appear in the drawing as lines formed by parallel bars. The first signaling network provides communications between the ISCP 40 and the SSP's 11, 13, 15, 17 and between the individual SSP's 11, 13, 15, 17. The second signaling network provides communications between the ISCP 40 and the IP's 35, 37. More specifically, the SCP 43 connects to the SSP's via the SS7 network and the STP's 44. For the second signaling communication system a router shown as a small rectangle on the ring 44 provides a two-way communication connection to a data network, for example an Ethernet (IEEE 802.3) type local area network, another token ring, or a mixture of token ring and local area network, etc., going to the individual IP's 35, 37. Other types of high speed data networks can be used between the ISCP 40 and the IP's 35, 37. Typically, the second signaling network will provide higher capacity data transport than the first signaling communication network.

One IP may connect to one SSP. Alternatively, an IP may connect to two or more switching systems, or two or more IP's may connect to the same switching office. For example, in the illustrated network, the IP 35 connects to two SSP type central office switching systems 13, 15. The IP 37 connects to one SSP type central office switching system 17. The precise number of IP's in the network and the number thereof connected to different switching systems is determined by projected traffic demands for IP service features from the subscribers' lines connected to the various switching systems.

In the preferred embodiment, the connection from the IP to the SSP would utilize a primary rate ISDN type trunk line for carrying both voice channels and signaling information. However, a number of alternate implementations of this connection can be used. For example, the connection may take the form of a T1 circuit carrying a number of Multiplexed Centrex line channels. If additional data signaling is necessary from the switch to the IP, a Simplified Message Desk Interface (SMDI) link can be provided. SMDI is a standard form of maintenance port, available on many types of telephone switching systems, through which calling party number information can be supplied. For older switching systems not capable of call transfer through ISDN signaling or signaling on T1 Centrex lines, an additional switch could be added between the IP and the SSP.

The AIN topology illustrated in FIG. 1 is exemplary in nature, and other network topologies can be used. For example, the illustrated networks include SSP functionality in each of the end office switching systems. In some networks, at least some of the end offices may not have SSP capabilities. Each such end office would connect to a trunk which in turn feeds calls to a tandem switching system with SSP capabilities. The SSP tandem communicates with the ISCP, as in the implementation described above. For the SSP capable end office switches that may be present in the network, they communicate directly with the ISCP, in the same manner as in the embodiment of FIG. 1. In such networks, each peripheral announcement platform or IP could connect to one or more of the non-SSP end offices, one or more SSP capable end offices and/or to the SSP capable tandem. The SSP capable tandem office switch is a digital switch, such as the 5ESS switch from AT&T. The non-SSP type end offices might be 1A analog type switches.

Figure 3:
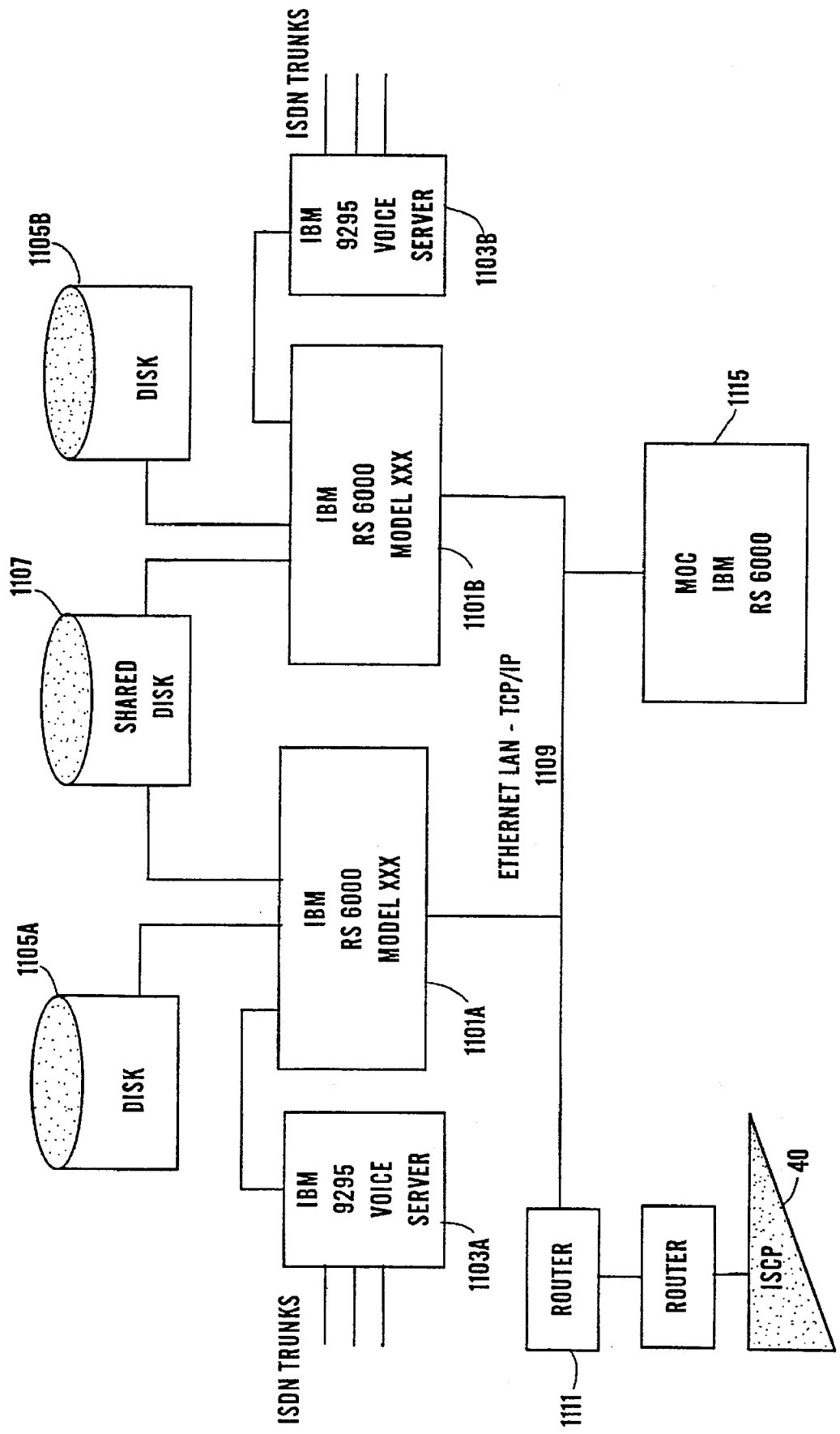
FIG. 3 illustrates one embodiment of an Intelligent Peripheral (IP) used in the network of FIGS. 1 and 5.

FIG. 3 illustrates a first, preferred embodiment of an IP used in the network of FIG. 1. In this implementation, the IP may consist of two or more general purpose computers 1101A, 1101B, such as IBM RS-6000's. Each general purpose computer will include a digital voice processing card for sending and receiving speech and other audio frequency signals, such as an IBM D-talk 600. Each voice processing card will connect to a voice server card 1103A or 1103B which provides the actual interface to T1 or primary rate interface ISDN trunks to the SSP type switching office. The plurality of computers may have associated dedicated disk storage 1105A, 1105B, and the IP will included a shared disk memory 107.

Each computer will also include an interface card for providing two-way communications over an internal data communications system, an Ethernet type local area network 1109. The Ethernet carries communications between the individual computers and between the computers and a router which provides an interconnection to the second signaling communications network going to the ISCP. A router 1111 connected to local area network 1109 provides a two-way coupling of the IP to the second data network, for example an Ethernet (IEEE 802.3) type local area network, a token ring, or a mixture of token ring and local area network, etc., at least for communications to and from the ISCP 40. If the X.25 network serves as the signaling network between the ISCP and the IP's, then only one such router connected to that network would be included within the IP.

The IP may also include another general purpose computer 1115 configured as a terminal subsystem, for use as a maintenance and operations center (MOC) and providing operations personnel access to the IP. The number of processors provided in the IP and the number of voice servers will depend on project service demands. One additional processor and associated voice server will be provided as a backup (not shown).

Each general purpose computer 1101A, 1101B will run a node manager, an IP/ISCP Interface program, appropriate voice processing and voice recognition/authentication software and a variety of application software modules to offer the proposed services of the IP. The central administrator or "Node Manager" program module, running on each computer, will monitor and control the various IP resources and operations.

The digital voice processing card and associated software will provide speech synthesis, speech recognition capabilities and DTMF tone signal reception, for use in a number of different applications. The speech synthesis and DTMF tone signal reception, for example, may replace the announcement and digit collection functions of the SSP switches in various existing AIN services. The general purpose computers and associated circuits may also run a variety of other types of service program modules, for example, a voice mail server module and/or a fax mail server module.

Figure 4:
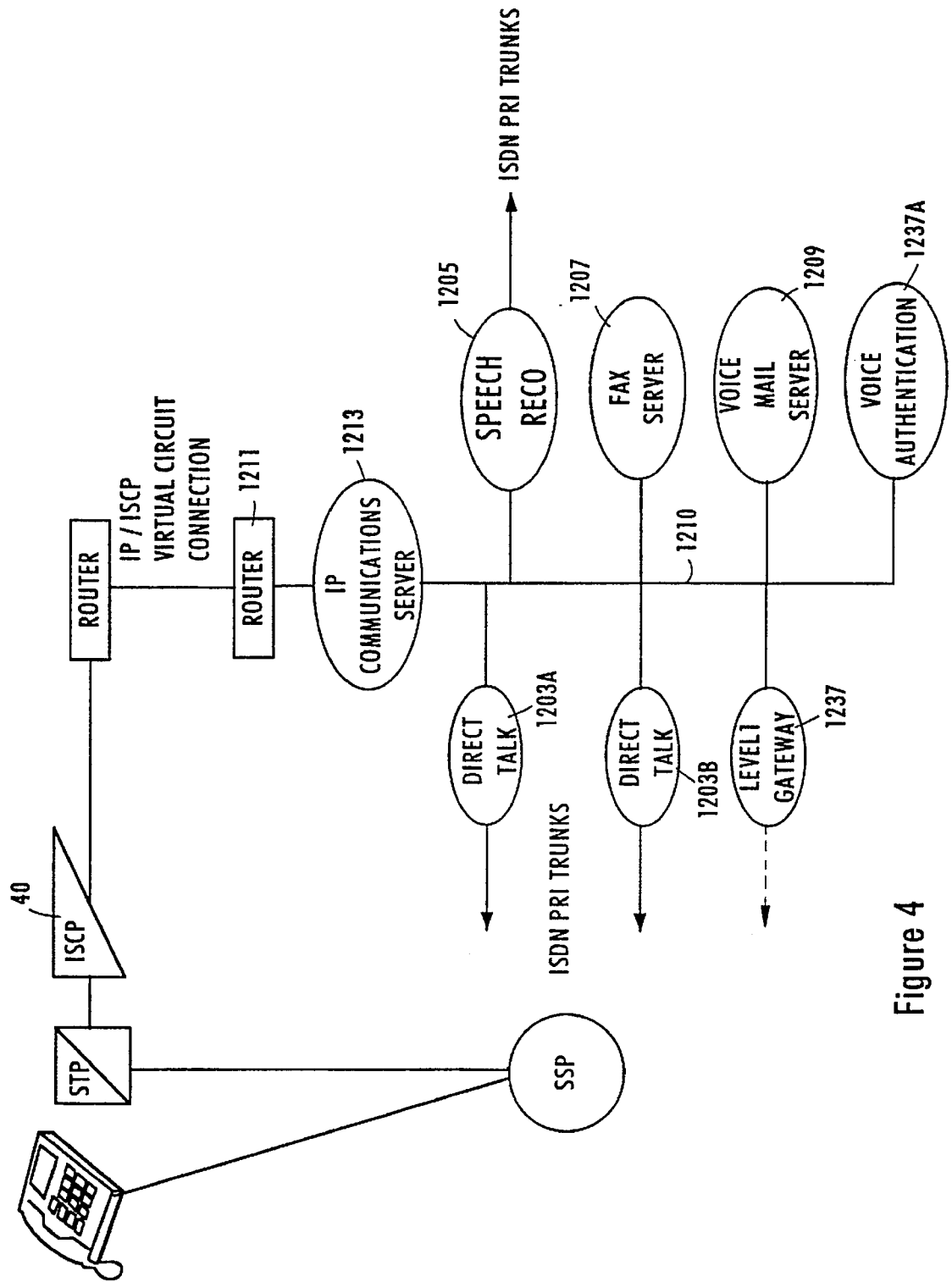
FIG. 4 illustrates an alternate embodiment of an IP used in the network of FIG. 3.

FIG. 4 illustrates an alternate embodiment of the IP used in the network of FIG. 3. The alternate architecture utilizes separate modules for different types of services or functions, for example, one or two Direct Talk type voice server modules 1203A, 1203B for interfacing the trunk to the SSP, a separate module 1205 for speech recognition, a server module 1209 for voice mail, and another server 1207 for fax mail services, a level 1 gateway module 1237 for controlling broadband services, a speech authentication module 1237A, etc. The various modules communicate with one another via an internal data communication system 1210, which again may be an Ethernet type local area network.

The Direct Talk modules 1203A, 1203B provide voice message transmission and dialed digit collection capabilities, as in the earlier embodiment. The modules 1203A, 1203B also provide line interfaces for communications to and from those servers which do not incorporate line interfaces. For example, for facsimile mail, the Direct Talk module connected to a call would demodulate incoming data and convert the data to a digital format compatible with the internal data communication network 1210. The data would then be transferred over network 1210 to the fax server 1207. For outgoing facsimile transmission, the server 1207 would transfer the data to one of the Direct Talk modules over the network 1210. The Direct Talk module would reformat and/or modulate the data as appropriate for transmission over the ISDN link to the SSP. The Direct Talk modules provide a similar interface function for the other servers, such as the voice mail server 1209.

The illustrated IP also includes a communication server 1213. The communication server 1213 connects between the data communication system 1210 and the router 1211 which provides communications access to the second signaling communication system and the ISCP 40 and other IP's which connect to that signaling communication system. The communication server 1213 controls communications between the modules within the IP and the second signaling communication system. Again, if the X.25 network serves as the signaling network between the ISCP and the IP's, then only one router 1211 and the communication server 1213 are included within the IP. Alternatively, the communications to and from the ISCP may transit a network separate from the X.25 network used for control signaling relating to the broadband services. In such a case, the IP would include the communication server 1213 and router the 1211 connected to the second network going to the ISCP, and the level 1 gateway module 1237 would include a separate additional router (not shown). This additional router would provide a two-way data coupling to the X.25 network.

In each of the proposed architectures, the SSP switch would route voice grade telephone calls to the different elements of the IP in response to instructions from the ISCP. In the initial implementation using general purpose computers (FIG. 3), each of which offers all service functionalities, the decision to route to a particular one of the computers would be a resource availability/allocation decision. If necessary, data can be exchanged between the computers via the internal data communications network, e.g., if a message for a particular subscriber's service is stored in the disk memory associated with one computer but the other computer is actually processing the call. In the second implementation (FIG. 4), however, the ISCP would instruct the SSP to route the call to the particular line to the specific module capable of providing a calling customer's individual service. For example, if the subscriber has some form of speech recognition service, the call would be routed to the speech recognition module 1205. For voice authentication, via a preestablished voice template, the call would be routed to module 1237A. If the subscriber has a voice mail service, the ISCP would instruct the SSP to route the call to one of the lines going to one of the voice server modules 1203A, 1203B, The module 1203A, or 1203B would receive outgoing voice messages from the voice mail server 1209 for transmission to the caller. The module 1203A or 1203B would decode DTMF signals and supply appropriate data to the voice mail server for control purposes. The module 1203A or 1203B would also format incoming voice messages for transmission over internal network 1210 and storage by server 1209. This query message is in the above described TCAP format for an initial query from an SSP.

The query message includes a substantial amount of relevant information, such as the dialed digits and the identification of the telephone line from which the party originated the present call. The originating SSP sends the TCAP query via a CCIS link to an STP. The STP recognizes that the TCAP query is addressed to the ISCP and retransmits the query, either directly or through a further STP, and the SS7 links to the ISCP.

The ISCP 40 uses information contained in the TCAP query message to access data tables stored in the SCP database 43. The ISCP uses data from the retrieved tables to translate the information from the TCAP query into an appropriate instruction for the SSP. At this point, the instruction will take a different form depending on whether or not the relevant AIN service requires some processing feature provided by the IP.

Figure 5:
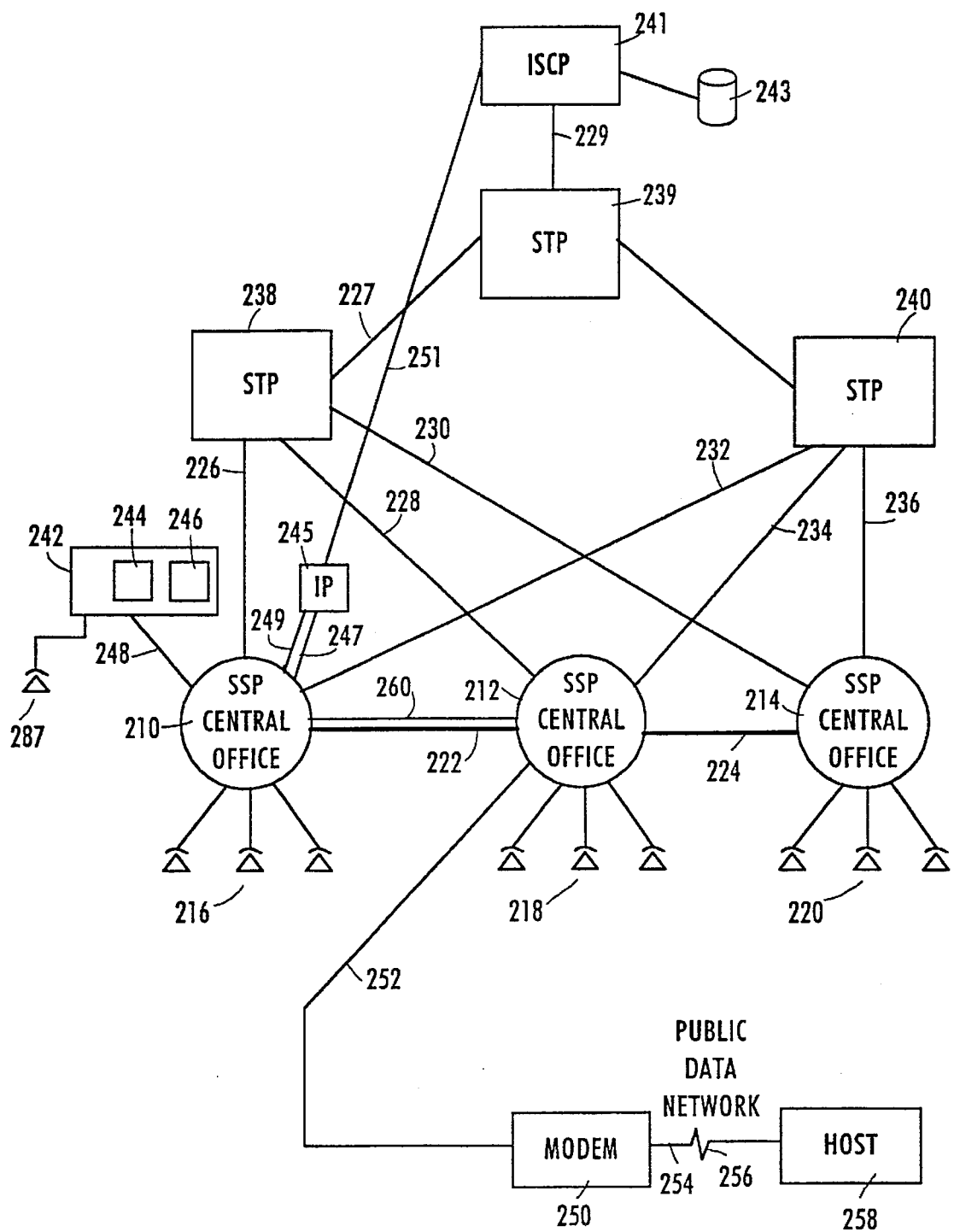
FIG. 5 is a simplified diagram of an AIN switched telephone network as connected to a point of sale credit card authorization terminal and to the public data network and thence to a computer maintained by the credit card issuer or financial institution for effecting credit card authorization.

If the service identified in response to the information in the original TCAP query message requires one or more call processing functions of the IP, the ISCP transmits a "SEND TO RESOURCES" type TCAP message or a similar message from the +1129 protocol back to the SSP via the STP's of the SS7 signaling network. This message would include sufficient information to route the call to one of the lines going to a voice server interface 1103A or 1103B within the IP. If the IP connects directly to the SSP, the SSP simply activates appropriate internal switching elements to establish the call connection channel between the caller and the IP. If the IP does not connect to the particular SSP, the instruction will provide sufficient information to route the call through another switching system to the IP. As previously stated and as shown in FIGS. 1 and 5, the ISP is also directly connected by a second communication data link to the IP.

When the IP receives the call, the SSP may provide the IP with a substantial amount of information about the particular call, including the dialed digits and the calling party's telephone number. In response to the call, the IP may formulate a query message containing this information. The IP may transmit this query message to the ISCP via the second signaling communication network. The ISCP will utilize the information from the IP query message to access the stored data tables in the SCP database 43, formulate an appropriate instruction, and transmit that instruction back to the IP via the second signaling communication network. For example, in a call blocking type service or in the service of the present invention requiring a caller to input a PIN number in order to reach a called subscriber or effect credit card authorization, the instruction might identify a prompting message and specify a number of digits to be collected. The IP would receive the message and perform the call processing function specified in the instruction. In the present voice authentication embodiment of the invention, the instruction would direct the IP to select the template corresponding to the calling user, have the user speak the word represented by the template, make the comparison, and signal a match or no-match. In the case of a match, the IP would be instructed to complete the transaction and store the pertinent record data.

At this point processing by the IP may be complete, or further interaction with the ISCP may be necessary to determine how to dispose of the call or transaction. If further processing is necessary, the IP will again communicate with the ISCP by transmitting a message, which may be another query, up to the ISCP through the second signaling communication network.

In a call blocking example, the IP function would involve retrieval of the identified message from memory and provision of that message to the digital voice card. The digital voice card would synthesize appropriate speech signals for transmission through the voice server card 1103A or 1103B and the voice network to the caller. This voice message might say "Jane Smith does not wish to be disturbed at this time. If you wish to leave a message please stay on the line." Callers familiar with Ms. Smith would know that this blocking feature could be overridden by input of a personal identification number (PIN) which Ms. Smith had given them. The IP would wait a specified time period and would collect any dialed digits received during from the caller during that period. The IP would then formulate a query or other format message including any dialed digits received or information indicating a lack of receipt of digits and transmit that data message back up to the ISCP through the second signaling communication system.

The ISCP 40 will utilize the information from the latest IP query message to again access the stored data tables in the SCP database 43, formulate an appropriate instruction for further processing and transmit that instruction back to the IP via the second signaling communication network. Continuing with the call blocking example, the ISCP would identify whether or not a correct PIN was dialed in by the caller. If not, the next message to the IP would instruct the IP to execute a voice mail box script for the called subscriber. The IP would play an outgoing message and record an incoming message to the caller. After completion of the mailbox script, IP processing would be complete and the IP would disconnect the call and processing would end.

Not all processing of AIN telephone calls by the IP ends in a simple disconnect. Other alternative call dispositions are possible. The most common, such as used in the present invention, is that after all other processing the IP will instruct the SSP to transfer the call to a specified destination, which may be the credit card authentication facility of a credit card issuer or financial institution. In such a case, the message transmitted from the ISCP to the IP would specify an actual destination number. In the call blocking example, if the ISCP determined that the caller had dialed in a valid PIN, the ISCP would transmit the telephone number for Jane Smith's current location. The IP will request call transfer by the SSP and supply the destination number to the SSP. For example, if the link to the SSP uses ISDN, the IP would transmit a transfer request and the destination digits over the D-channel. As an alternate example, if the link is T1 carrying multiplexed Centrex lines, the IP would simulate a hookflash on the line or channel carrying the call and then outpulse the digits of the destination number. In response to the transfer request, the SSP routes the call to the destination and tears down the prior call connection between the caller and the IP.

Referring to FIG. 5 there is shown a simplified diagram of an AIN switched telephone network as used in the present invention. The network is connected at one illustrated telephone station to a point-of-sale credit card authorization terminal 242 and to the public data network 256 and thence to a host computer 258 maintained by the credit card issuer or financial institution for effecting credit card authorization in the conventional manner. In that figure there is seen a point-of-sale credit card authorization terminal 242 including the conventional modem 244 and auto-dialing device 246. The credit card authorization terminal 242 is connected by a station line or local loop 248 to the central office 210 which is an SSP office. The point-of-sale authorization terminal receives dial tone from that office and conventionally includes a telephone station 287.

Connected to a designated end office, which is here illustrated as central office 212, is a conventional line side modem or modem pool arrangement 250. The modem 250 exercises a line protocol and is connected to the central office 212 via a line hardware interface and line 252. The modem 250 may be conveniently located at or adjacent to the end office 212. Modem 250 is connected by an outgoing tieline 254 to a packet switch in the public data network indicated generally at 256. Conventional X.25 packet protocol or other protocols may be used. The public data network 256 connects to the issuers host computer 258 for effecting the credit card authorization in the conventional manner.

The originating central office 210 is connected to the terminating central office or end office 212 via feature group B or feature D trunks which are indicated diagrammatically at 260, although it will be understood that feature group trunks may be included within the trunk connection 222 between the central offices 210 and 212. It will be appreciated that while this simplified illustration involves connection to end offices which constitute SSPs, there may be one or more central offices and/or tandem switches between the originating central office and the terminating central office connected by feature group B or feature group D trunks executing conventional E & M trunk protocol. The operation of this credit card authorization system in its normal fashion is described in detail in U.S. Pat. No. 5,315,641, issued May 24, 1994, to the assignee of the instant application. The contents of that patent are incorporated herein fully by reference. The operation of a preferred embodiment of the invention may be described as follows:

The subscriber may access the service for programming purposes by dialing a number which may be a virtual number in the telephone system, such as an 800 number. This accesses a voice response menu system using hardware which may be provided at the switch, at the ISCP, or in an intelligent peripheral or other network device. For security purposes a user ID and password system or a PIN may be used.

The subscriber may access the system through his own residence telephone, or by remote access from another telephone. Preferably, the telephone is a DTMF or Touch-tone Telephone™. If the subscriber uses his own telephone the subscriber's identify is determinable from the ANI, ICLID, or DNIC signal. If the subscriber uses a remote phone other than his residence telephone the identity of the caller will be ascertained in a dialogue with a voice prompt system and the directory number of the credit security service subscriber which is keyed in response to a request in the dialogue. Alternatively, voice recognition may be used in place of DTMF signaling.

Once the user has logged into the system by entering the correct number and password, ID or PIN, the subscriber may select from a menu of parameters offering options for programming the service. From the menu, the subscriber may elect to activate the identified card or cards for a selected period of time. This may be in the form of a time duration commencing immediately, such as three hours from the present time, or a time period with designated commencement and termination times, such as from 9 a.m. of a stated date to 1 p.m. of the same date. Following this input the voice messaging unit will play back to the customer the requested time and any errors of entry may be corrected in known fashion as will be understood.

Assuming that an activation time is established, the customer may next be asked if he wants to specify an area for authorized usage, such as a zip code area, an access area, city or county boundary area, etc. Again, the voice messaging unit will play back the entry for confirmation by the customer.

The customer next may be asked if he wants to place a dollar limit on the authorization and, if so, in what amount. This will be keyed or spoken in by the customer and confirmed by the voice messaging.

The foregoing will constitute the most frequently used parameters. However, additional safeguards will be available. For example, the voice message can then inquire as to whether the customer desires to mandatorily or optionally require the card user to supply upon request a temporary ID or PIN number. If so, this will be entered by the subscriber in response to a voice message and confirmed. As a further mandatory or optional safeguard, the subscriber may be offered the option of establishing a temporary voice recognition authentication password to be spoken by the card user during the card activation session being programmed. If this is selected, the user will be requested to speak such password or number and the affirmative response of the subscriber to the inquiry as to whether such a password should be established will trigger the creation of a voice authentication template at the intelligent peripheral IP in a known manner, such as, for example, as described in Applicant's copending patent application Ser. No. 08/322,133, filed Oct. 13, 1994, attorney Docket No. 680-107, now U.S. Pat. No. 5,513,250.

When this programming is completed the processor in the IP will generate a message to activate the security service for the credit card number of the caller which has been identified and established in the credit card number database of the IP.

It will be understood that the subscriber may utilize any combination of the foregoing safeguards on a one time basis, or a per day, per week, or per month schedule. Thus, the card holder may elect to have the card authorized for use on a daily 24 hour, 9 a.m. to 5 p.m. basis, in a specified area, for a specified amount. This can be changed by the subscriber at any time in the manner of the original programming.

The use of the card subject to the security provisions is now described in connection with FIG. 5.

The traditional approach to credit card authorization transactions is to provide a service establishment, such as a store, with a special authorization terminal equipped with an internal asynchronous modem which is connected to a local telephone line. When a credit card is moved through a slot on the terminal past a magnetic stripe reader, information is collected from the magnetic stripe on the card. The terminal then goes off hook on the telephone line and dials a number previously programmed into the terminal. Equipment, including a modem, at the called site answers the call. After the call is answered, data communication is established. The data transmission for dial-up credit card authorizations is most often governed by the Visa protocol. Information from the magnetic stripe, information previously programmed into the terminal, and information keyed into the terminal by the merchant about the specific sale are transmitted up-line to a host computer where the request is processed and an authorization code or other information (e.g., a request to call for voice authorization) is transmitted back to the point-of-sale terminal. Upon receiving the response, the terminal goes on-hook and the call is terminated. Many terminals can be programmed to dial different numbers based upon the information contained in the magnetic stripe on the card being processed.

Further information regarding conventional handling of credit card authorization is described in U.S. Pat. No. 4,796,292, issued Jan. 3, 1989 to Jerry S. Thomas, and assigned to American Express Company.

According to the present invention, when the SSP central office 210 receives the DTMF virtual number dial-up signal from the device 242 a TCAP message is dispatched to the STP 238, STP 239, and ultimately to the ISCP 241 via the AIN data links 226, 227 and 229, seeking routing direction. The ISCP accesses a database 243 where there is stored the identity of the issuer of the credit cards and the card numbers of the subscribers to the service as entered by the subscribers. If a search of that database discloses that the card number received from the point of sale is not a subscriber to the security service, the ISCP dispatches a responsive TCAP message back to the SSP 210 directing connection of the call from the point of sale device through the central office 212 to the modem 250, public data network 256 and host authorization computer 258. Card validation then proceeds in the conventional manner without the security safeguards of the service of the invention.

If the search of the database 243 indicates that the card number is a subscriber to the security service the ISCP dispatches a data message to the intelligent peripheral (IP) 245 identifying that transaction device and the subscriber and directory number with which it is associated.

The IP is connected to the SSP central office 210 via a voice connection 247 and a data connection 249. It will be understood that through the use of ISDN or a T1 link this may constitute a single link as previously described. The IP is also connected to the ISCP via a data link 251 which is distinct from the preexisting SS7 network and which may or may not use SS7 protocol, also as previously described. Alternatively, the ISCP may communicate with the IP through the existing SS7 network and the link between the SSP central office 210 and IP 245.

On receiving this signaling control message from the ISCP, the processor at the IP addresses the appropriate database to locate the service profile of the transaction device or card and the subscriber. The IP thereupon proceeds through a matching procedure wherein the parameters established by the subscriber are tested against the contents of the control signal from the ISCP and against signaling between the IP and point-of-sale station 242 through the SSP central office 210.

By way of example, a subscriber to the new service may establish a service profile by calling the new service facility associated with the central office 210 which may be the SCP 43 shown in FIG. 1. The caller requests a subscription to the transaction security service. Thereupon there ensues a dialogue between the caller and a live operator or a Voice Processing Unit (VPU) which may be located at the IP as described in connection with FIGS. 3 and 4. In that dialogue the identity of the directory number and subscriber is automatically available to the service facility via ANI, ICLID, or DNIC. The dialogue entails the calling party identifying one or more transaction devices or cards, by name, number, and expiration date. This information is stored in a database at the IP and in the database 43 at the ISCP via suitable signaling between the IP and ISCP. The caller is then requested to establish a series of parameters which may include a PIN, and voice print or template.

When the transaction device or credit card holder intends to use the transaction device or card, he may access the security system and be verified by the PIN or voice template thus established. Thereupon, the card holder may set a series of parameters which he desires as a necessary prerequisite to activation of the card or transaction device. These parameters may include, a set period of time, such as, for the next three hours, or for example, from 9 a.m. to 1 p.m. on a specified date; a limit on the credit card total purchasing power during that time, such as, for example, $250.00; a geographic location for the use of the credit card, such as, a city, country, zip code area, or NXX area; and, a temporary PIN that would be applicable under the foregoing restrictions in order to complete activation. Voice authentication may also be established as an additional parameter as previously described.

Following initial establishment of this service profile, the card holder may thereafter arrange for activation of the card for use by calling a directory number provided to the caller in the establishment of the subscription and service profile, verifying the identity of the caller by the pre-established PIN and/or voice authentication template. After successful completion of such verification the caller may activate the identified card by establishing the desired set period of time, limit on purchasing power, location of use, and temporary PIN for use subject to the satisfactory establishment of the foregoing parameters.

When the card user thereafter conducts a transaction using the transaction device or credit card, the point of sale credit card authentication device 242 is thereafter used by the merchant, as by swiping a magnetic strip on the card through the card reader. This results in autodialing of a virtual number associated with credit card authentication in the conventional manner. The credit card swipe signal to the central office 210 also contains the number and expiration date of the swiped card. As previously described, a conventional credit card authorization procedure is then followed to communicate between the SSP central office 210 and the ISCP 241 through the SS7 network using link 226, STP 238, link 227, regional STP 239, link 229, and ISCP 241 with its database 243. The card number is checked to determine whether or not the caller is a subscriber to the new security service by the ISCP accessing its card number database 243. If the inquiring card number does not match that of a subscriber, the ISCP thereupon uses the SS7 network to signal the SSP central office 210 to route the credit card authentication inquiry in the usual fashion through SSP central offices 210 and 212 to the modem 250, public data network 256, and host authentication computer 258.

If the ISCP determines that the inquiring credit card number is a subscriber to the new service, it preferably dispatches a data message via datalink 251 direct to the IP 245, which signal includes the identity of the transaction device or credit card and its expiration date. The IP thereupon accesses the service profile established by the user and makes a parameter comparison as dictated by the user's choice and values of parameters. Thus, it is first determined whether or not the authentication request is within the time frame set by the user. Following an affirmative determination of that parameter it is next determined whether the transaction exceeds the monetary limit established by the subscriber. As an optional service the telephone company may provide subscriber access to a totalizer at the IP for maintaining a running total of the transactions upon a designated card within the time frame.

Following an affirmative response to the monetary comparison, the processor at the IP next compares the geographic location of the calling station, i.e. the transaction device 242, as determined by ANI, ICLID, or DNIC, with the area designated by the subscriber. Following an affirmative response the VPU at the IP requests and obtains from the person attempting to use the credit device a vocalization of the temporary ID or PIN established by the user for the time frame. Following an affirmative comparison the VPU at the IP may request the user to repeat the word used to create the voice identification template stored at the IP. It will be understood that not all of the steps need be required in every instance and that the voice steps in particular may be permitted to be at the option of the merchant seeking authentication. The merchant may request such additional authentication steps either through a voice line and telephone station at the transaction authentication device or card reader, or the depression of a predetermined DTMF key or keys, by way of example.

Figure 6:
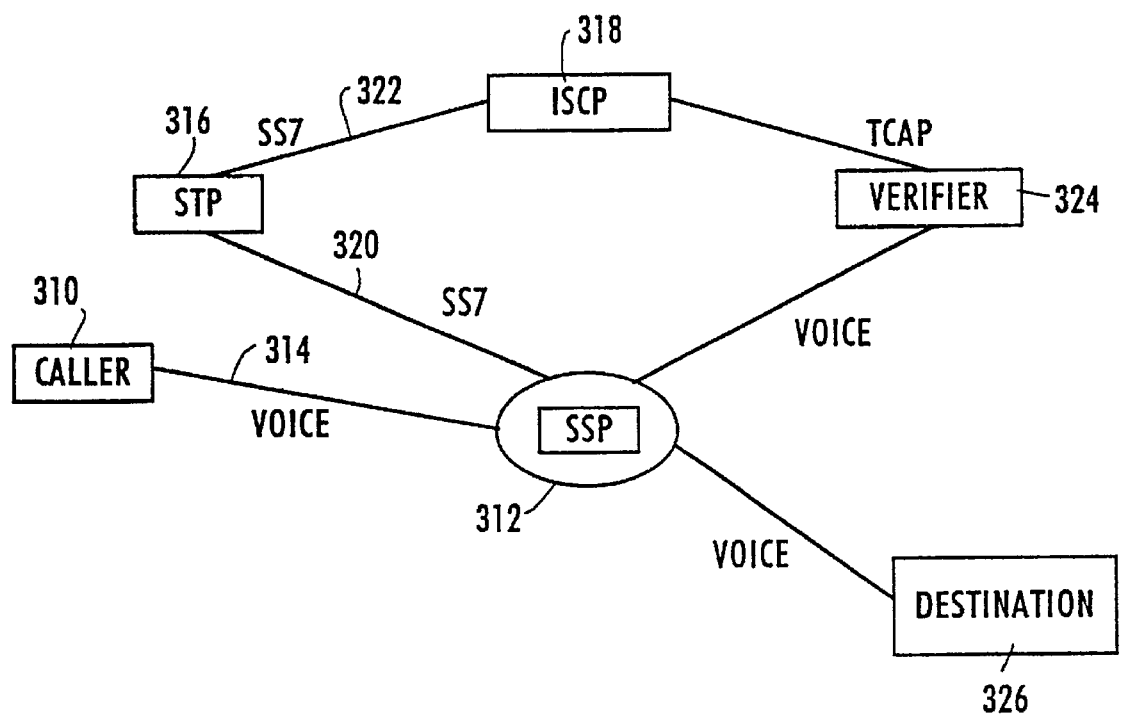
FIG. 6 shows a simplified block diagram of the active elements in the network used for carrying out the added security measures to accomplish verification according to the embodiment of the invention here described.

Referring to FIG. 6 the present preferred embodiment of the invention is described. According to this embodiment the use of the added security system and method is preestablished by virtue of coding inserted in the data carried by the credit card, such as in the commonly used magnetic strip. When the card is passed through the card reader at the point of use, such as at the point of sale or at an Automatic Teller Machine (ATM) or the like, the verification procedure that would ordinarily follow is suspended pending satisfaction of the requirements of the added security measures. However the invention also comprehends and includes usage of the system and service in situations where it is not convenient or practical the include such special coding in the credit or transaction cards themselves.

There are numerous instances where business establishments or service providers may require security measures in addition to those ordinarily associated with the use of credit or transaction or the like cards. Examples are banking services or account information at any establishment, point-of-sale authorization, medical record access, personal information databases, PBX DISA services, or the like. PBX DISA refers to Private Branch Exchange Direct Inward System Access. DISA is a feature of a telephone system which allows an outside caller to dial directly into the telephone system and to access all the system's features and facilities. DISA is typically used for making long distance calls from home using the company's less expensive long distance lines, like WATS or tie lines. To use DISA, one must key in from a DTMF phone a short string of numbers as a password code. A problem with the feature is that unauthorized persons not infrequently acquire that number and make fraudulent use of the long distance services. PBX features that are vulnerable to unauthorized access include call forwarding, call prompting and call processing features.

In situations where the merchant or service provider can control the nature and contents of credit cards usable to access the service, it is possible to use the embodiment of the present invention wherein the card itself contains a code which triggers the added security measure when the card is read. A primary example of this type of situation is found with banking transactions which require use of a card issued by the bank itself to each qualified customer. However other businesses which accept a variety of credit cards from various sources cannot exercise this type of control. In still other circumstances credit or the like cards are not used, such as with PBX DISA, as discussed above. The present invention provides means of requiring the use of the desired added security measures in all such situations.

In the case of business establishments engaging in point-of-sale transactions and desiring to subscribe to the added security service, a data base of subscribers may be established at the ISCP (or a designated IP if desired). Considering by way of example a transaction at a gas pump at a gas station, a plurality of different credit cards are usually accepted and the proprietor has no control over the content of those cards. In such a situation the invention provides for actuation of the added security measures by initiating an inquiry to the ISCP triggered by the identity of the calling line and the identity of the called number. In this case the calling line would be associated with the connection to the gas pump card readers and the identity of the called credit card service bureau would be associated with the called number. Both numbers are available to the ISCP using conventional TCAP signaling. The calling number is checked against the subscriber data base and, if the calling line is identified as a subscriber, the added security steps are initiated. This is implemented without the necessity of the subscriber having any control over the content of the credit card. While identification of both the calling and called number have been described and may be used in combination, it should be understood that both identifications need not always be required.

In the case of PBX DISA the same methodology is applicable without any requirement that a credit card or device be employed. Access of PBX DISA requires the caller to input a prerequisite access number or code, and this may be utilized to initiate a query to the ISCP which formulates a response directing use of the security steps.

The operation of this embodiment of the invention is now described in relation to the simplified diagram shown in FIG. 6. At 310 there is indicated a caller station which may be a card reader as shown at 242 in FIG. 5, or may be a telephone in the case of a person seeking access to PBX DISA. The caller at station 310 is connected to an SSP at 312 via a voice link 314. If the caller constitutes a transaction device such as a card reader, the security measures may be initiated either in response to a code detected from the card by the reader or, in the alternative, by the identity of the calling station as may be established from the ANI, ICLID, directory number, NNX or the like. As a further alternative the triggering may be based on the identity of the called number or by the combined identity of the calling and called numbers.

The SSP recognizes the trigger and formulates a TCAP inquiry message to the ISCP 318 via the STP 316 which are connected by data links 320 and 322, preferably using SS7 protocol. The ISCP determines from its associated data base that added security steps are required. This may be either by recognition of the code from the credit card transmitted by the caller, from the identity of the calling number as a subscriber to the service, or by the identity of the called number as a subscriber to the service. In the latter situation the operator of the credit card authorization or validation service, such as the host computer 258 in FIG. 5, may subscribe to the service. According to the invention the service may be offered as a centralized verification or security bureau or center which may be made available by the operating telephone company.

Following the appropriate recognition of the call by the ISCP the ISCP initiates a response data message to a verifier 324 to conduct a voice verification. At the same time the ISCP directs the SSP to suspend the originally dialed call to the destination 326 and directs connection of the caller at 310 to the verifier 324. The verifier 324 may be a voice recognition module or platform in an IP, such as the IP's shown and described in connection with FIGS. 3 and 4. The voice recognition platform selects the voice template created by the person to whom the credit card issued or by the person qualified or accredited to use PBX DISA.

The voice recognition template for each user must be established prior to usage of the service and this may be accomplished in a manner appropriate to the particular subscriber. Thus in the instance where a credit or transaction card is issued to the subscriber the establishment of a voice recognition template may be required as a condition of issuance of the card. Alternatively the template may be required only if the recipient of the card desires to qualify the card for use at specified establishments. That is, if the credit card issuer does not require use of the voice verification as a condition of use of the card the issuer may nevertheless inform the recipient that the card may not be usable for certain designated transactions. With respect to such transactions the card will be recognized and accepted only if the recipient establishes a voice recognition template and satisfies the voice recognition requirements in using the card for those transactions. Creation of the template may be carried out as above described in connection with the earlier described embodiments of the invention requiring voice recognition.

In the situations where a credit card or transaction device is not involved, such as PBX DISA, the person seeking issuance of a password or number to access the involved service may be required to establish a voice recognition template before the service or access can be actuated.

Following establishment of the voice connection between the verifier 324 and caller 310 the steps of voice verification are performed as previously described. If the verification requirement is satisfied as determined in the verifier or IP, either the IP dispatches a message to the ISCP to that effect or the IP dispatches a message direct to the SSP 312 directing establishment of the connection of the caller 310 to the destination 326. In the case where the destination 326 constitutes a credit card validation bureau, such as at 258 in FIG. 5, the normal credit card validation then proceeds following the precedent added security of the voice verification through the central verification service. Where the caller seeks a service such as PBX DISA which does not involve a credit or transaction card, the destination may constitute the PBX. The conventional verification of PBX DISA access then will be performed following the added security steps of voice authentication.

It will be obvious that the voice verification security step requires some facility for the user to speak the predetermined word or words for communication to the verification module. In most instances of credit cards at point of sale transactions, a telephone station already exists and is frequently used for vocalized communication between the validation bureau and the point of sale. Where such a telephone station exists it may serve as the terminal for input of the voice to be validated as authentic. In other instances, such as ATM machines and gas pumps, a telephone station is not now normally available. According to the invention such transaction points are provided with telephone or telephone type terminals connected to voice circuits to a central office switch. Alternative to handset type telephones a speaker and microphone or a combination speaker/microphone are provided.

It will be apparent from the foregoing that the centralized verification center provided by the present invention provides numerous advantages. The centralized center makes it possible for users to establish voice authentication templates a single time for use in and with varied transactional activities. A wide variety of businesses are provided with a fully operational virtually instantly available security system. Duplication of such systems may be eliminated or at least minimized. There is no necessity for each business desiring the added security measure to investigate competing equipment or systems or to make a substantial capital investment.

Although several preferred embodiments of the invention have been described in detail above, it should be clear that the present invention is capable of numerous modifications as would be apparent to one of ordinary skill in the art. Such modifications fall within the purview of the appended claims.

I claim:

1. In a telephone system comprising:
   telephone stations;
   spaced central office switching systems interconnected via trunk circuits for selectively providing switched telephone call communications between at least two of said telephone stations;
   a service control point, separate from said central office switching systems, comprising a database storing call processing data associated with a plurality of said telephone stations for control of call processing through one or more of said central office switching systems;
   a peripheral platform connected to at least one of said central office switching systems via a telephone call connection channel, the peripheral platform comprising means for providing at least one auxiliary telephone call processing capability via the telephone call connection channel and including a database of personal speech identification templates;
   a signaling communication system separate from said trunk circuits for two-way communications of data messages between said central office switching systems, between said central office switching systems and said service control point, and between said peripheral platform and said services control point;
   a transaction authentication platform;
   a method comprising the steps of:
   (a) initiating a call by dialing a virtual number at one of said telephone stations which results in sending control signals from one of said switching systems to said service control point, said control signals representing an inquiry regarding the call and including data identifying a transaction device and including data identifying action to be taken with respect to said transaction device;
   (b) said service control point identifying a service corresponding to said virtual number and accessing in its database data identifying transaction devices of subscribers to said service;
   (c) on identifying one of said transaction devices in said data identifying transaction devices in said database, sending control signals to said peripheral platform for providing said service, said control signals identifying said one of said transaction devices;
   (d) said peripheral platform using the identity of said one of said transaction devices to access a personal speech identification template corresponding to the identity of said one of said transaction devices;
   (e) connecting said dialing telephone station to said peripheral platform for voice communication;
   (f) inputting to said connected telephone station a voice utterance of a word corresponding to a word used to create said template;
   (g) receiving at said peripheral platform a signal resulting from the inputting of said utterance;
   (h) comparing said received signal with said template to establish a match;
   (i) if a match is not established for said utterance terminating the connection to said connected station;
   (j) if a match is established sending to said one of said switching systems control signals directing further connection of said connected telephone station to said transaction authentication platform.

2. A method according to claim 1 wherein said data identifying action to be taken with respect to said transaction device is derived from said transaction device.

3. A method according to claim 2 wherein said dialing is responsive to a transaction device reader reading data from said transaction device.

4. A method according to claim 3 wherein said transaction device is a card and said transaction device reader is a card reader.

5. A method according to claim 3 wherein step (i) includes the steps of:

A. if a match is established accessing a database of prestored parameters corresponding to transaction devices, at least one of said parameters corresponding to the transaction device identified in said call;
B. determining the present value of the parameter which is accessed;
C. comparing the present value of the parameter which is accessed to the prestored value of said parameter;
D. if a match is established sending to said switching system control signals directing connection of said connected telephone station to said transaction authentication platform.

6. A method according to claim 5 wherein the parameter which is accessed is selected from (i) a time period, (b) a monetary limit, and (iii) a geographic area.

7. A method according to claim 3 including the establishment of at least one of said parameters by the steps of:
A. a subscriber to a telephone station connected to one of said central office switching systems calling a new service facility of said switching system and requesting a subscription to a transaction device security service;
B. responsive to connection to said facility said caller in cooperation with said facility establishing at least one of the following parameters:
   (i) a time period during which said transaction device is activated;
   (ii) a monetary total for which said transaction device may be used to conduct transactions during said time period
   (iii) a geographic area in which said transaction device may be used to conduct transactions during said time period; and
   (iv) an identification signal valid for use of said transaction device during said period.

8. A method according to claim 7 wherein said parameters are stored in a database associated with said peripheral platform.

9. A method according to claim 1 wherein step (i) includes the steps of:
A. if a match is established accessing a database of prestored parameters corresponding to transaction devices to identify at least one stored parameter corresponding to the transaction device identified in said call;
B. determining the present value of said one parameter;
C. comparing the present value of said one parameter to the prestored value of said parameter which has been accessed;
D. if a match is established sending to said one of said switching systems control signals directing further connection of said connected telephone station to said transaction authentication platform.

10. A method according to claim 9 wherein said one parameter is selected from (i) a time period, (b) a monetary limit, and (iii) a geographic area.

11. A method according to claim 9 including the establishment of at least one of said parameters by the steps of:
A. a subscriber to a telephone station connected to one of said trunk connected switching systems calling a new service facility of said telephone system and requesting a subscription to a transaction device security service;
B. responsive to connection to said facility said calling subscriber in cooperation with said facility establishing as a parameter at least one of the following:
   (i) a time period during which said transaction device is activated;
   (ii) a monetary total for which said transaction device may be used to conduct transactions during said time period
   (iii) a geographic area in which said transaction device may be used to conduct transactions during said time period; and
   (iv) an identification signal valid for use of said transaction device during said period.

12. A method according to claim 11 wherein said parameters are stored in a database associated with said peripheral platform.

13. In a telephone system comprising:
telephone stations;
spaced central office switching systems interconnected via trunk circuits for selectively providing switched telephone call communications between at least two of said telephone stations;
a service control point, separate from said central office switching systems, comprising a database storing call processing data associated with at least certain of said telephone stations for control of call processing through one or more of said central office switching systems;
a peripheral platform connected to at least one of said central office switching systems via a telephone call connection channel, said peripheral platform comprising means for providing at least one auxiliary telephone call processing capability via the telephone call connection channel and including a database of personal speech identification templates;
a signaling communication system separate from the trunk circuits for two-way communication of data messages between said central office switching systems, between said central office switching systems and said service control point, and between said peripheral platform and said services control point;
a transaction authentication platform;
a method comprising the steps of:
   (a) initiating a call by dialing a virtual number at one of said telephone stations which results in sending control signals from one of said switching systems to said service control point representing an inquiry regarding the call and including data identifying a transaction device and including data identifying action to be taken with respect to said transaction device, said last named data being associated with at least one of the calling or called numbers;
   (b) said service control point determining from its database a service corresponding to said at least one of said numbers;
   (c) on identifying said action sending control signals to said peripheral platform for providing said determined service, said control signals identifying said transaction device;
   (d) said peripheral platform using the identity of the transaction device determined by said control signals in step (c) to access a personal speech identification template corresponding to the identity of said transaction device;
   (e) connecting said dialing telephone station to said peripheral platform for voice communication;
   (f) inputting to said connected station a voice utterance of a word corresponding to a word used to create said template;
   (g) receiving at said peripheral platform a signal resulting from the inputting of said utterance;
   (h) comparing said received signal with said template to establish a match;

(i) if a match is not established for said utterance terminating the connection to said connected station;

(j) if a match is established sending to the switching system to which said telephone station is connected control signals directing further connection of said connected telephone station to said transaction authentication platform.

14. A method according to claim 13 wherein said dialing is responsive to a transaction device reader reading data from said transaction device.

15. A method according to claim 14 wherein said transaction device is a card and said transaction device reader is a card reader.

16. A method according to claim 15 wherein step (i) includes the steps of:
A. if a match is established accessing a database of prestored parameters corresponding to transaction devices to identify at least one of said prestored parameters corresponding to the transaction device identified in said call;
B. determining the present value of the parameter which is identified;
C. comparing the present value of the parameter which is identified to the prestored value of said parameter;
D. if a match is established sending to said switching system control signals directing connection of said calling telephone station to said transaction authentication platform.

17. A method according to claim 16 wherein a parameter is selected from (i) a time period, (b) a monetary limit, and (iii) a geographic area.

18. A method according to claim 15 including the establishment of at least one of said parameters by the steps of:
A. a subscriber to a telephone station connected to one of said switching systems calling a new service facility of said switching system and requesting a subscription to a transaction device security service;
B. responsive to connection to said facility said calling subscriber in cooperation with said facility establishing at least one of the following parameters:
(i) a time period during which said transaction device is activated;
(ii) a monetary total for which said transaction device may be used to conduct transactions during said time period
(iii) a geographic area in which said transaction device may be used to conduct transactions during said time period; and
(iv) an identification signal valid for use of said transaction device during said period.

19. A method according to claim 18 wherein said parameters are stored in a database associated with said peripheral platform.

20. A method according to claim 13 wherein step (i) includes the steps of:
A. if a match is established accessing a database of prestored parameters corresponding to transaction devices, to identify at least one stored parameter corresponding to the transaction device identified in said call;
B. determining the present value of said one parameter;
C. comparing the present value of the parameter accessed to the prestored value of said parameter which has been accessed;
D. if a match is established sending to the switching system to which said telephone station is connected control signals directing further connection of said connected telephone station to said transaction authentication platform.

21. A method according to claim 20 wherein a parameter is selected from (i) a time period, (b) a monetary limit, and (iii) a geographic area.

22. A method according to claim 13 including the establishment of at least one of said parameters by the steps of:
A. a subscriber to a telephone station connected to one of said spaced switching systems calling a new service facility of said switching system to which said telephone station is connected and requesting a subscription to a transaction device security service;
B. responsive to connection to said facility said caller in cooperation with said facility establishing at least one of the following parameters:
(i) a time period during which said transaction device is activated;
(ii) a monetary total for which said transaction device may be used to conduct transactions during said time period
(iii) a geographic area in which said transaction device may be used to conduct transactions during said time period; and
(iv) an identification signal valid for use of said transaction device during said period.

23. A method according to claim 22 wherein said parameters are stored in a database associated with said peripheral platform.

24. In a telephone system comprising:

telephone stations;

spaced central office switching systems interconnected via trunk circuits for selectively providing switched telephone call communications between at least two of said telephone stations and including connections between said telephone stations and end central offices associated therewith;

a service control point, separate from said central office switching systems, comprising a database storing call processing data associated with a plurality of said telephone stations for control of call processing through one or more of said central office switching systems;

a peripheral platform connected to at least one of said central office switching systems via a telephone call connection channel, said peripheral platform comprising means for providing at least one auxiliary telephone call processing capability via said telephone call connection channel and including a database of personal speech identification templates;

a signaling communication system separate from said trunk circuits for two-way communication of data messages between said central office switching systems, between said central office switching systems and said service control point, and between said peripheral platform and said services control point;

a transaction authentication platform;

a transaction device reader at the site of at least one of said telephone stations associated with one of said switching systems;

a method comprising the steps of:
(a) initiating a call by reading a transaction device at the site of said telephone station at which said transaction device is located to generate a signal causing dialing of a virtual number which results in sending control signals from the switching system with which the telephone station at which said transaction device is located is associated to said service control point representing an inquiry regarding the call and including data identifying said transaction device and including data identifying action to be taken with respect to said transaction device, said last named data being associated with at least one of the calling or called numbers;

(b) said service control point determining from its database a service corresponding to said at least one of said numbers;

(c) on identifying said action sending control signals to said peripheral platform for providing said determined service, said control signals identifying said transaction device;

(d) said peripheral platform responding to said control signals by accessing a personal speech identification template which is identified by said control signals;

(e) connecting said dialing telephone station to said peripheral platform for voice communication;

(f) inputting to said connected telephone station a voice utterance of a word corresponding to a word used to create said template;

(g) receiving at said peripheral platform a signal resulting from the inputting of said utterance;

(h) comparing said received signal with said template to establish a match;

(i) if a match is not established for said utterance terminating the connection to said connected station;

(j) if a match is established sending to said switching system from which said call was originated control signals directing further connection of said connected telephone station and transaction device reader to said transaction authentication platform;

(k) reading said transaction device with said transaction device reader;

(l) sending a data signal to said transaction authentication platform representative of the information contained in said data signal;

(m) following authentication of said transaction device sending a data signal to said transaction device reader authorizing said transaction.

25. A method according to claim 24 wherein said transaction device is a card and said transaction device reader is a transaction card reader.

26. In a telephone system comprising:

telephone stations;

spaced central office switching systems interconnected via trunk circuits for selectively providing switched telephone call communications between at least two of said telephone stations;

a service control point, separate from said central office switching systems, comprising a database storing call processing data associated with a plurality of said telephone stations for control of call processing through one or more of said central office switching systems;

a peripheral platform connected to at least one of said central office switching systems via a telephone call connection channel, said peripheral platform comprising means for providing at least one auxiliary telephone call processing capability via the telephone call connection channel and including a database of personal speech identification templates;

a signaling communication system separate from said trunk circuits for two-way communications of data messages between said central office switching systems, between said central office switching systems and said service control point, and between said peripheral platform and said services control point;

a method comprising the steps of:

(a) initiating a call by dialing a number at one of said telephone stations which results in sending control signals from one of said switching systems to said service control point representing an inquiry regarding the call and including data identifying a procedure being requested;

(b) said service control point determining the procedure being requested and the entitlement of the telephone station which initiated said call to said procedure as indicated by data transmitted to said service control point;

(c) on establishing said entitlement sending control signals to said peripheral platform, said control signals identifying the source of the request on the basis of identification signals inputted at said telephone station at which said call was initiated;

(d) said peripheral platform using said control signals identifying the source of said request to access a personal speech identification template corresponding to said identity of said source of said request indicated by said identification signals;

(e) connecting said dialing telephone station to said peripheral platform for voice communication;

(f) inputting to said connected station a voice utterance of a word corresponding to a word used to create said template;

(g) receiving at said peripheral platform a signal resulting from the inputting of said utterance;

(h) comparing said received signal with said template to establish a match;

(i) if a match is not established for said utterance terminating said connection to said connected station;

(j) if a match is established sending to said switching system to which said telephone station is connected control signals directing further connection of said connected telephone station to access the requested procedure.

27. A telephone system comprising:

telephone stations;

spaced central office switching systems interconnected via trunk circuits for selectively providing switched telephone call communications between at least two of said telephone stations and including connections between said telephone stations and end central offices associated therewith;

a service control point, separate from said central office switching systems, comprising a database storing call processing data associated with a plurality of said telephone stations for control of call processing through one or more of said central office switching systems;

a peripheral platform connected to at least one of said central office switching systems via a telephone call connection channel, said peripheral platform comprising means for providing at least one auxiliary telephone call processing capability via said telephone call connection channel and including a database of personal speech identification templates;

a signaling communication system separate from said trunk circuits for two-way communications of data messages between said central office switching systems, between said central office switching systems and said service control point, and between said peripheral platform and said services control point;

a transaction authentication platform;

a voice processing unit;

a transaction device reader at the site of at least one of said telephone stations and connected to the connection of said telephone station to its end office switch, said transaction device reader on reading a transaction device initiating the dialing of a virtual number associated with that transaction device reader;

said switching systems comprising program controlled switches programmed so that said dialing of said virtual number results in sending control signals from the switching system to which said end office switch is connected to said service control point, said control signal representing an inquiry regarding the dialing of said vertical number and including data identifying the transaction device read by said transaction device reader;

said service control point responsive to receiving said control signal determining the service corresponding to said virtual number and sending control signals to said peripheral platform, said signals including identification of said transaction device;

said peripheral platform responding to said control signals including identification of said transaction device by accessing the speech identification template corresponding to the identity of said transaction device as indicated by said control signals;

said peripheral platform following accessing said template causing the initiation from said voice processing unit of a request to utter the speech corresponding to the speech represented by said template;

said peripheral platform on receiving signals representative of a responsive utterance into the telephone station at the site of said transaction device reader comparing said signals to said template to attempt to establish a match;

said peripheral platform on establishing a match originating data signals to cause said telephone station at the site of said transaction device reader and said transaction device reader to be connected to said transaction authentication platform.

28. A telephone system comprising:

telephone stations;

central office switching systems interconnected via trunk circuits for selectively providing switched telephone call communications between at least two of said telephone stations and including connections between said telephone stations and end central offices associated therewith;

a service control point, separate from said central office switching systems, comprising a database storing call processing data associated with a plurality of said telephone stations for control of call processing through one or more of said central office switching systems;

a peripheral platform connected to at least one of said central office switching systems via a telephone call connection channel, said peripheral platform comprising means for providing at least one auxiliary telephone call processing capability via the telephone call connection channel and including a database of personal speech identification templates;

a signaling communication system separate from said trunk circuits for two-way communications of data messages between said central office switching systems, between said central office switching systems and said service control point, and between said peripheral platform and said services control point;

a transaction authentication platform;

a voice processing unit;

a transaction device reader at the site of at least one of said telephone stations and connected to the connection of said telephone station to its end office switch, said transaction device reader on reading a transaction device initiating the dialing of a virtual number associated with that transaction device reader;

said switching systems comprising program controlled switches programmed so that dialing said virtual number at a predetermined one of said telephone stations results in sending control signals from said switching system to which said predetermined telephone station is connected to said service control point, said control signal representing an inquiry regarding said dialing and including data identifying the calling telephone station and the transaction device read by said transaction device reader;

said service control point responsive to receiving said control signals determining the service corresponding to said virtual number and identity of said predetermined telephone station and sending control signals to said peripheral platform, said signals including identification of said transaction device;

said peripheral platform responding to said control signals to identify said transaction device to access the speech identification template corresponding to said transaction device identified by said control signals;

said peripheral platform following accessing said template causing the initiation from said voice processing unit of a request to utter the speech corresponding to the speech represented by said template;

said peripheral platform on receiving signals representative of the responsive utterance comparing said signals to said template to attempt to establish a match;

said peripheral platform on establishing a match originating data signals to cause said predetermined telephone station and transaction device reader to be connected to said transaction authentication platform.

29. A telephone system according to claim 28 wherein said transaction device reader again reads said transaction device following connection of the transaction device reader to said transaction authentication platform and initiates a signal representative of the data read to said transaction authentication platform, and said authentication platform on establishing authentication initiates a signal to said transaction device reader authorizing said transaction.

* * * * *